July 26, 1955  R. M. DODGE  2,713,806
END PLAY TAKE UP WASHER
Filed March 20, 1952
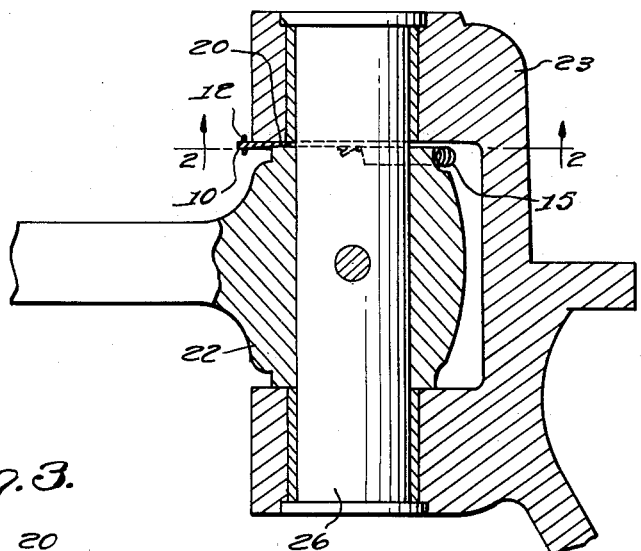
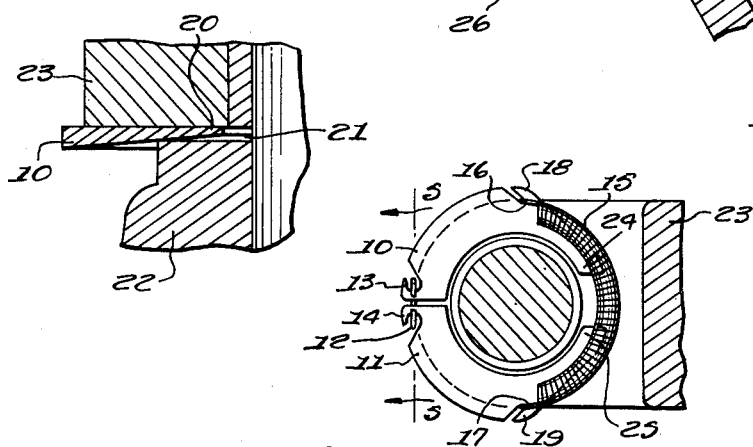
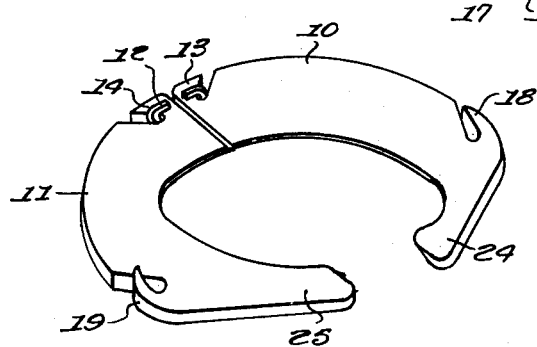
INVENTOR.
Ruez M. Dodge,
BY Victor J. Evans & Co.
ATTORNEYS

2,713,806

END PLAY TAKE UP WASHER

Ruez M. Dodge, Charleston, W. Va.

Application March 20, 1952, Serial No. 277,686

1 Claim. (Cl. 85—51)

This invention relates to devices for taking up wear or end play in rotating or pivotally connected parts of machinery and particularly motor vehicles, and in particular a washer formed with hinged sections in which the sections are wedge-shaped in cross section and in which the free ends of the sections are connected with a spring, whereby the thin inner edges of the sections are drawn into the area at the end of a hub or between a knuckle and stationary part such as of a steering assembly of a motor vehicle.

The purpose of this invention is to provide an improved end play take up washer wherein an inner thin tapering edge of a washer is urged into an area at the end of a hub or the like by a spring and wherein the washer contacts the end of the hub and adjoining parts at points on both sides of the center.

The washer of this invention is an improvement over the washer of my co-pending application filed June 27, 1951, with the Serial No. 233,914 in that the take up washer is formed of a plurality of hinged sections which are drawn inwardly by a spring from both sides providing two points of contact wherein with the washer of the co-pending application the actual contact and wedge action is at one point only.

Various types of devices, such as shims and thin continuous washers have been used, however, with a continuous washer the thickness is uniform throughout and as wear develops it is necessary to separate the connection and change the washer. With this thought in mind this invention contemplates a washer formed of sections, wedge shape in cross section, whereas with the sections urged into the joint by a spring the sections are drawn inwardly continuously as wear develops so that automatic adjustment is provided.

With the washer of the co-pending application the washer is drawn inwardly from one side and with the wear concentrated at one point the wear is excessive.

The object of this invention is, therefore, to provide means for forming take up washers of this type whereby the wear is taken up at a plurality of points and at points on both sides of the center of the connection.

Another object of the invention is to provide an improved end play take up washer in which bearing surfaces thereof are distributed around the end of a moving part of a vehicle or other machine and that may be installed on equipment now in use without separating the parts, of the machine or equipment.

A further object of the invention is to provide an end play take up washer formed with hinged sections which is of a simple and economical construction.

With these and other objects and advantages in view the invention embodies a pair of substantially semi-circular members wedge shaped in cross section having hooks on adjoining ends and also hooks in the outer surfaces and positioned intermediate of the ends, with a ring extended over the hooks of the adjoining ends to provide a hinge joint and with a spring extended over the hooks intermediate of the ends and adapted to be positioned around a pin or shaft upon which the washer is positioned for urging the sections inwardly toward the shaft.

Other features and advantages of the invention will appear from the following description taken in connection with the drawing wherein:

Figure 1 is a vertical section through the third arm and bracket of a steering assembly of a motor vehicle with the pin shown in elevation and illustrating the position of the end play take up washer therein.

Figure 2 is a cross section taken on line 2—2 of Fig. 1 illustrating the position of the end play take up washer in use.

Figure 3 is a detail illustrating the position of the end play take up washer with the thin inner edge of the wedge shaped section of the washer extended into the area between the hub and bracket.

Figure 4 is a perspective view illustrating the sections of the washer with the spring and connecting ring omitted.

Figure 5 is a detail showing a section taken on line 5—5 of Fig. 2 illustrating the connecting or split ring with which the sections of the washer are hinged together.

Referring now to the drawing wherein like reference characters denote corresponding parts the improved end play take up washer of this invention includes sections 10 and 11 hinged with a split ring 12 which is positioned over hooks 13 and 14, and a coil spring 15, the ends of which are provided with eyes 16 and 17 and the eyes are positioned over hooks 18 and 19, respectively in the outer edges of the sections 10 and 11.

As illustrated, particularly in Fig. 3 the sections 10 and 11 of the end play take up washer are wedge shaped in cross section and the sections are positioned with the thin edge extended inwardly, as illustrated in Fig. 3 wherein the thin inner edge 20 extends into an area 21 between a hub 22 of a third arm of a steering assembly and a hub of a bracket 23.

As illustrated in Figs. 2 and 4 the sections 10 and 11 of the washer are provided with extended tongues 24 and 25 respectively, and the ends of the spring 15 overlap the tongues as illustrated in Fig. 2.

With the parts formed in this manner one end of the spring 15 is removed from one of the hooks of the washer and with the opposite or adjoining ends of the sections of the washer hinged with the split ring 12 the washer is inserted in the joint, as illustrated in Fig. 1 and the end of the spring hooked over the hook of the section of the washer on the side of the connection on which the free end of the spring is positioned.

With the washer installed in this manner the spring urges the sections of the washer into the area between the members of the joint and with the sections of the washer substantially semi-circular as illustrated the sections crowd into the area providing substantially continuous bearing surfaces which substantially fill the area and thereby take up end play developing in the connection.

In the design shown the end play take up washer is positioned in one end of the hub 22 of the third arm of a steering assembly of a motor vehicle and the upper hub of the bracket 23 and the hub is mounted in the bracket with a pin 26. It will be understood, however, that the end play take up washer of this invention may be used in other types of joints or between moving and stationary parts of vehicles or machines of other types.

It will also be understood that modifications may be made in the design and arrangement of the parts without departing from the spirit of the invention.

What is claimed is:

In an end play take up washer, a pair of substantially semi-circular similar sections, the inner portions of said sections coacting to define a circular opening for receiving a pin, each of said sections being wedge shaped in cross section, the inner edge of said sectons terminating in a knife edge and being of less thickness than the outer edge of the section, said sections each having a first inclined slot defining a hook in the outer edge thereof, said first slots being arranged adjacent an end of said sections, a split ring extended over said hooks and connecting adjoining ends of said sections together, a tongue formed integral with each of said sections and being of less width than the remaining portion of said sections, there being an inclned cut out in each of said sections defining a hook, said cut outs being smaller than said slots, a coil spring having eyes on its ends arranged in engagement with said last named hooks, the outer ends of said hooks being pointed, said coil spring overlapping outer portions of said tongues, said cut outs extending tangentially with respect to said pin, the thin inner edges of said sections extending into an area between a hub of an arm of a steering assembly and a hub of a bracket, the adjacent end portions of said sections contigious to said slots being straight and arranged parallel to each, the outer ends of said tongues being spaced from each other a greater distance than the distance between said straight end portions when the sections are on the pin.

References Cited in the file of this patent

UNITED STATES PATENTS

| | | |
|---|---|---|
| 1,597,686 | Pratt | Aug. 31, 1926 |
| 1,825,410 | Monckmeier | Sept. 29, 1931 |
| 1,966,780 | Wyrick | July 17, 1934 |
| 2,509,081 | Bluth | May 23, 1950 |
| 2,522,397 | Palmer | Sept. 12, 1950 |

FOREIGN PATENTS

| | | |
|---|---|---|
| 894,783 | France | Jan. 5, 1945 |